United States Patent
Nam et al.

(10) Patent No.: US 7,864,876 B2
(45) Date of Patent: Jan. 4, 2011

(54) DIFFERENTIAL SPACE-TIME BLOCK CODING APPARATUS USING EIGHT OR LESS TRANSMIT ANTENNAS

(75) Inventors: Seung-Hoon Nam, Seoul (KR);
Yung-Soo Kim, Seongnam-si (KR);
Jae-Hak Chung, Seoul (KR); Vahid Tarokh, Cambridge, MA (US);
Chan-Soo Hwang, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 715 days.

(21) Appl. No.: 11/020,285

(22) Filed: Dec. 23, 2004

(65) Prior Publication Data

US 2005/0135499 A1    Jun. 23, 2005

Related U.S. Application Data

(60) Provisional application No. 60/532,246, filed on Dec. 23, 2003.

(30) Foreign Application Priority Data

Dec. 1, 2004    (KR)    ...................... 10-2004-0100048

(51) Int. Cl.
*H04B 7/02*    (2006.01)
(52) U.S. Cl. ...................... 375/267; 375/140; 375/141; 375/146; 375/295; 375/299; 370/203; 370/204; 370/320
(58) Field of Classification Search .................. 375/267
See application file for complete search history.

(56) References Cited

U.S. PATENT DOCUMENTS

| | | | | |
|---|---|---|---|---|
| 6,115,427 A | * | 9/2000 | Calderbank et al. | ......... 375/267 |
| 6,724,842 B1 | * | 4/2004 | Hochwald et al. | ........... 375/347 |
| 6,865,237 B1 | * | 3/2005 | Boariu et al. | ................ 375/295 |
| 7,154,936 B2 | * | 12/2006 | Bjerke et al. | ................ 375/148 |
| 7,283,783 B2 | * | 10/2007 | Larsson et al. | ............. 455/3.01 |

(Continued)

FOREIGN PATENT DOCUMENTS

KR    1020020015086    2/2002

(Continued)

OTHER PUBLICATIONS

Tarokh et al., "Space Time Block Coding from Original Design", IEEE Trans. On Info. Theory, vol. 45, pp. 1456-1467, Jul. 1999.*

(Continued)

*Primary Examiner*—Shuwang Liu
*Assistant Examiner*—Kenneth Lam
(74) *Attorney, Agent, or Firm*—The Farrell Law Firm, LLP (57) ABSTRACT

A differential STBC transmitting/receiving apparatus in a multiple antenna system using eight or less transmit antennas is provided. In the differential STBC transmitting apparatus, a symbol mapper receives binary data and generates a number of symbols from the binary data, each symbol having a number of bits. A space-time block encoder generates an STBC by encoding the symbols. A differential processor differentially encodes the STBC through feedback and delay. A distribution matrix processor substitutes the differentially coded STBC into a distribution matrix preset according to the number of transmit antennas, and outputs the differential STBC code of the distribution matrix to the transmit antennas.

4 Claims, 6 Drawing Sheets

U.S. PATENT DOCUMENTS

| | | | |
|---|---|---|---|
| 7,302,009 B2 * | 11/2007 | Walton et al. | 375/267 |
| 7,308,018 B2 * | 12/2007 | Seeger et al. | 375/141 |
| 2001/0031019 A1 | 10/2001 | Jafarkhani et al. | |
| 2002/0163892 A1 * | 11/2002 | Hassibi et al. | 370/310 |
| 2003/0072395 A1 * | 4/2003 | Jia et al. | 375/341 |
| 2004/0002364 A1 * | 1/2004 | Trikkonen et al. | 455/562.1 |
| 2004/0028271 A1 * | 2/2004 | Pollard et al. | 382/162 |
| 2004/0146014 A1 * | 7/2004 | Hammons et al. | 370/320 |
| 2005/0063483 A1 * | 3/2005 | Wang et al. | 375/267 |
| 2005/0190853 A1 * | 9/2005 | Tirkkonen | 375/295 |
| 2006/0232416 A1 * | 10/2006 | Bauch | 340/572.7 |
| 2006/0274846 A1 * | 12/2006 | Bauch | 375/267 |
| 2007/0183527 A1 * | 8/2007 | Jia et al. | 375/267 |

FOREIGN PATENT DOCUMENTS

| | | |
|---|---|---|
| KR | 1020030066091 | 8/2003 |
| WO | WO 02/35762 | 5/2002 |
| WO | WO 02/052773 | 7/2002 |

OTHER PUBLICATIONS

Tarokh et al., "A Differential Detection Scheme for Transmit Diversity", IEEE Journal on Selected Areas in Communications, vol. 18, No. 7, Jul. 2000, pp. 1169-1174.

Jafarkhani et al., "Multiple Transmit Antenna Differential Detection From Generalized Orthogonal Designs", IEEE Transactions on Information Theory, vol. 47, No. 6, Sep. 2001, pp. 2626-2631.

Chung et al., "Performance Evaluation of Multiple Transmit Antenna Non-Coherent Detection Schemes in Fast Fading Channels", Wireless Personal Communications, vol. 26, pp. 249-265, 2003.

* cited by examiner

DIFFERENTIAL SPACE-TIME BLOCK CODING APPARATUS USING EIGHT OR LESS TRANSMIT ANTENNAS

PRIORITY

This application claims priority under 35 U.S.C. §119 to an application entitled "Differential Space-Time Block Coding Apparatus For Up To Eight Transmit Antennas" filed in the United States Patent and Trademark Office on Dec. 23, 2003 and assigned Ser. No. 60/532,246, and under 35 U.S.C. §119 to an application entitled "Differential Space-Time Block Coding Apparatus Using Eight or Less Transmit Antennas" filed in the Korean Intellectual Property Office on Dec. 1, 2004 and assigned Serial No. 2004-100048, the contents of which are incorporated herein by reference.

BACKGROUND OF THE INVENTION

1. Field of the Invention

The present invention relates to a differential STBC (Space-Time Block Code) transmitting/receiving apparatus that can be applied to a multiple antenna wireless communication system using eight or less transmit antennas.

2. Description of the Related Art

Compared to the wired channel environment, the radio channel environment has low reliability due to multipath fading. Yet, in the radio channel environment, especially using multiple transmit antennas, the use of STBCs in a transmitter achieves a transmit diversity gain, thereby overcoming the fading and considerably increasing the reliability of the transmitted signals. These advantages cause the STBCs to be widely used.

If radio channel information is known to a receiver, conventional STBCs are used. In a real system, the radio channel information is estimated using training symbols.

However, a transmission scheme may be preferable which does not utilize the radio channel information in the case where it is not easy to estimate the radio channel information in the receiver or the estimation of the radio channel information is accompanied by too much overhead due to fast varying radio channels.

To use such a transmission scheme, a differential STBC transmitting/receiving apparatus was proposed. V. Tarokh and H. Jafarkhani proposed a differential STBC transmitting/receiving apparatus for a single transmit antenna in "A Differential Detection Scheme for Transmit Diversity", (IEEE J. Select. Areas Commun., Vol. 18, pp. 1169-1174, July 2000). They extended the idea of differential modulation used in a communication environment using a single transmit antenna to a conventional coherent differential STBC transmitting/receiving apparatus. V. Tarokh and H. Jafarkhani extended the scheme further to systems with more transmit antennas (i.e. 2, 3 and 4 transmit antennas) in their later thesis "Multiple Transmit Antenna Differential Detection from Generalized Orthogonal Designs", (IEEE Trans. On Info. Theory, Vol. 47, pp. 2626-2631, September, 2001).

The differential STBC transmitting/receiving apparatus shows a performance degradation of about 3 dB and a similar decoding complexity, compared to the existing STBC transmitting/receiving apparatus.

However, Jaehak Chung, et. al. proved in "Performance Evaluation of Multiple Transmit Antenna Non-Coherent Detection Schemes in Fast Fading Channel", (Wireless Personal Communications, Vol. 26, Issue 2-3, pp. 249-265, 2003) that in real implementation, a complex signal cannot be transmitted with the 8×4 STBC design proposed in "Multiple Transmit Antenna Differential Detection from Generalized Orthogonal Designs".

It is thus concluded that the Tarokh's scheme is viable for two transmit antennas in the case of transmitting a complex signal and for 2, 3 or 4 transmit antennas in the case of transmitting a real signal.

Figure 1A:
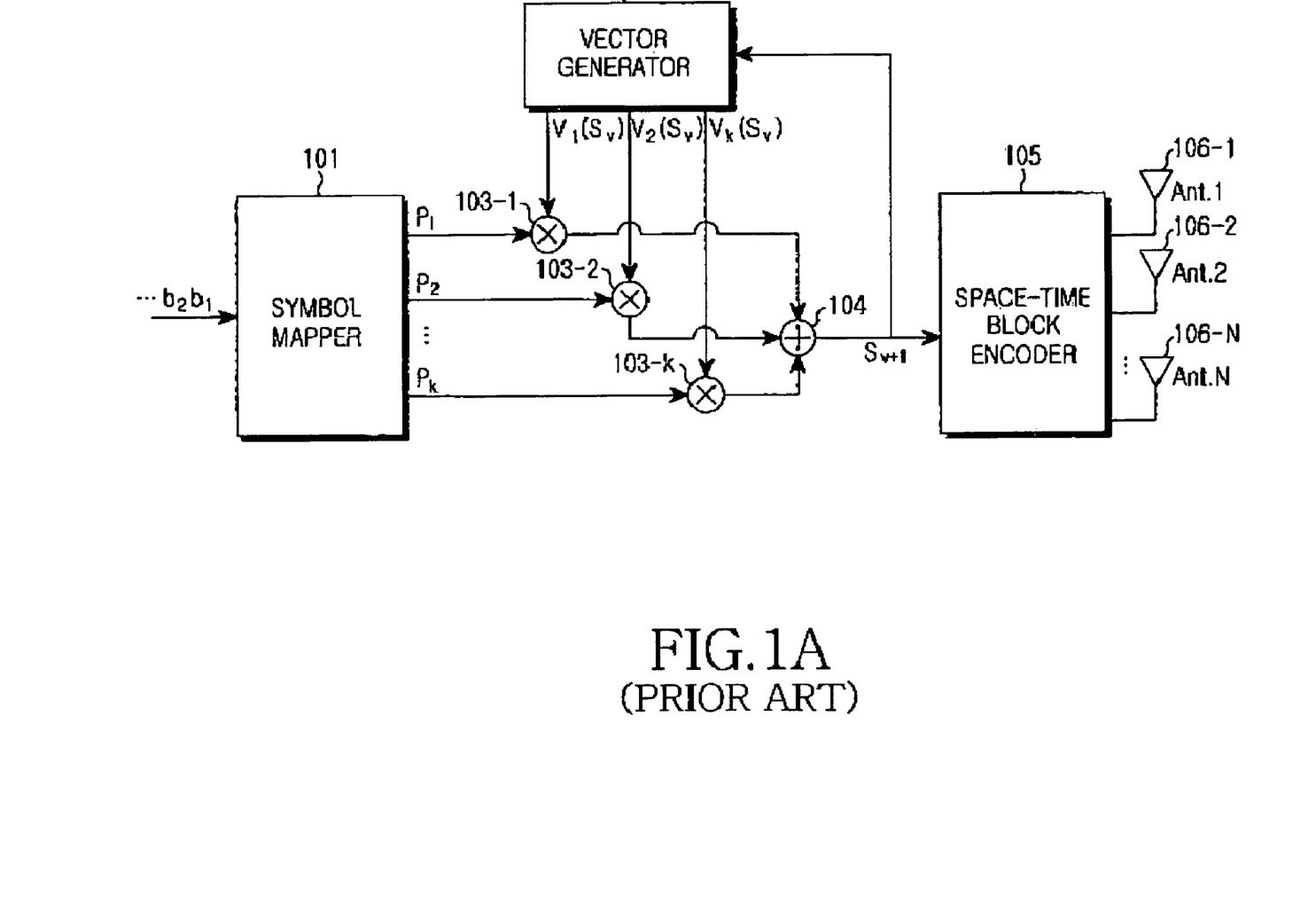
FIGS. 1A and 1B are block diagrams of a conventional differential STBC transmitting/receiving apparatus in a multiple antenna transmitting/receiving system.
Figure 1B:
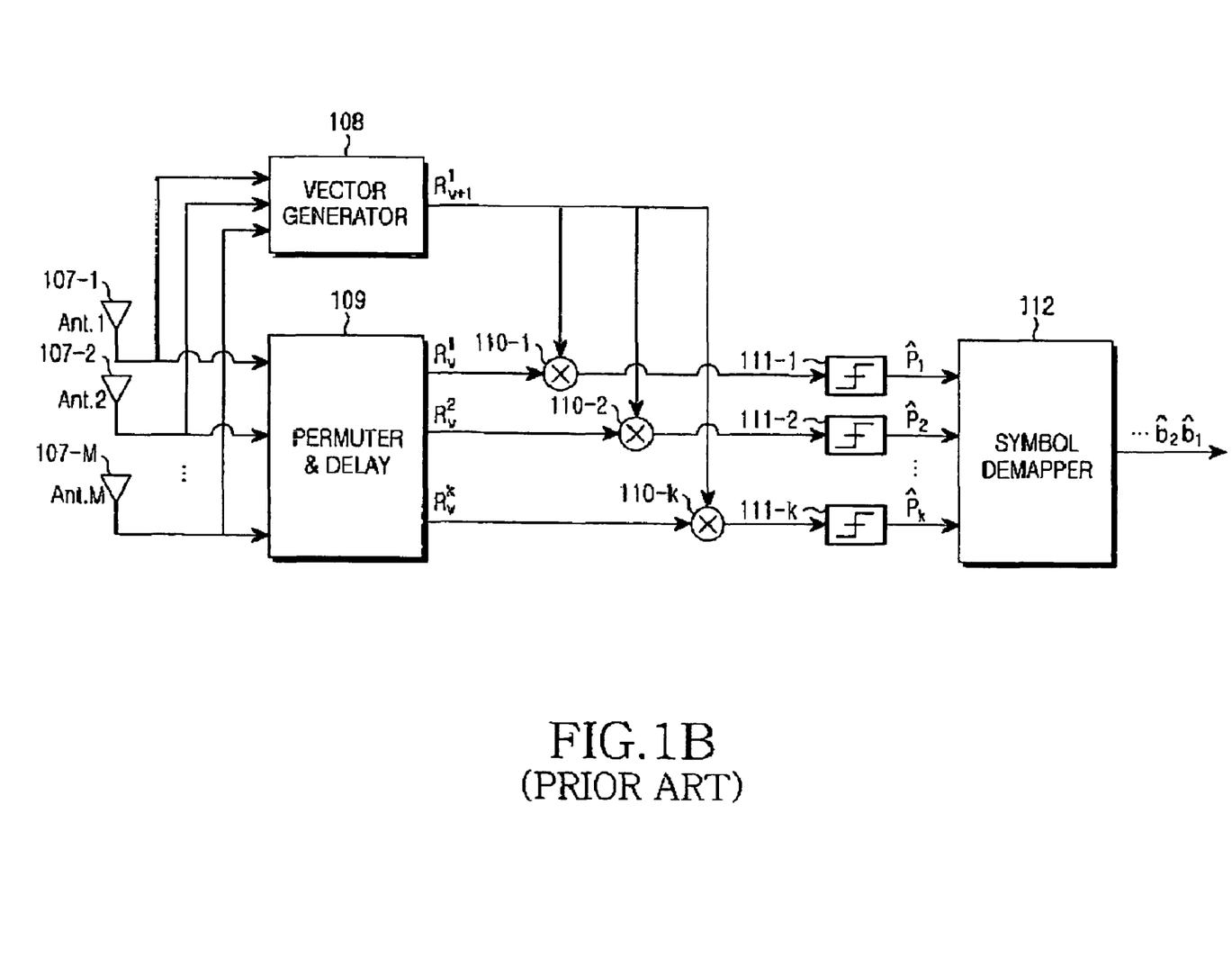

FIGS. 1A and 1B are block diagrams of a conventional differential STBC transmitting/receiving apparatus in a multiple antenna transmitting/receiving system.

FIG. 1A is a block diagram of a transmitter having N transmit antennas 106-1 to 106-N. Referring to FIG. 1A, the transmitter is composed of a symbol mapper 101 for generating k symbols, $P_1, P_2 \ldots P_k$ from the input binary data $b_1 b_2 \ldots b_i$ by mapping every $2^b$ bits to one symbol, a vector generator 102 for generating vector components for the input of a signal received from an adder 104, multipliers 103-1 to 103-$k$ for multiplying the symbols received from the symbol mapper 101 by the vectors, the adder 104 for adding the outputs of the multipliers 103-1 to 103-$k$, and a space-time block encoder 105 for generating a STBC using an encoding matrix whose entries are the sum received from the adder 104 and providing the STBC to the respective transmit antennas 106-1 to 106-N.

The symbols $P_1, P_2 \ldots P_k$ carry real information. For better understanding of the Tarokh's scheme disclosed in "Multiple Transmit Antenna Differential Detection from Generalized Orthogonal Designs", it will be described in the context of k=4. Using three transmit antennas amounts to deleting a signal to be transmitted through a fourth transmit antenna.

When a complex signal is transmitted in a differential STBC through four transmit antennas, one differential STBC block is equal in length to 8 symbol periods. Thus, the space-time block encoder 105 uses such a transmission matrix as illustrated below in Equation 1. The transmission matrix is characterized by orthogonality between columns.

$$\begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{bmatrix} \quad (1)$$

In a first block, arbitrary symbols $S_1=(s_1^1, s_2^1, s_3^1, s_4^1)^T$ are mapped to the positions of $x_1$, $x_2$, $x_3$ and $x_4$ in the above matrix. This operation is carried out in the Space-time block encoder 105. The symbols of the first block are generated irrespective of the input binary data. Hence, the first block symbols carry no information. The signals of subsequent blocks can be recursively expressed as follows.

For a $(v+1)^{th}$ block, four symbols $S_{V+1}$ are obtained by multiplying symbols $P_1$ to $P_k$ carrying information by vectors $V'_k(S_v)$ and then summing the products. The vectors $V'_k(S_v)$ have the four symbols $S_v=(s_1^v, s_2^v, s_3^v, s_4^v)^T$ transmitted in a $v^{th}$ block. The four symbols $S_{v+1}$ are expressed as shown in Equation 2:

$$S_{v+1} = \sum_{k=1}^{4} P_k V'_k(S_v) \qquad (2)$$

and $V'_k(S_v)$ is given as in Equation 3:

$$V'_1(S_v) = (s_1^v, s_2^v, s_3^v, s_4^v)$$

$$V'_2(S_v) = (s_2^v, -s_1^v, s_4^v, -s_3^v)$$

$$V'_3(S_v) = (s_3^v, -s_4^v, -s_1^v, s_2^v)$$

$$V'_4(S_v) = (s_4^v, s_3^v, -s_2^v, s_1^v) \qquad (3)$$

The thus-obtained $S_{v+1} = (s_1^{v+1}, s_2^{v+1}, s_3^{v+1}, s_4^{v+1})^T$ are mapped to $x_1$, $x_2$, $x_3$ and $x_4$ in the above matrix.

FIG. 1B is a block diagram of a receiver with M receive antennas 107-1 to 107-M. The receiver is comprised of a vector generator 108 for receiving a STBC from the transmitter through the receive antennas 107-1 to 107-M and generating vectors, a permuter & delay 109 for permuting and delaying the STBC, a plurality of multipliers 110-1 to 110-$k$ for multiplying the outputs of the permuter & delay 109 by the vectors received from the vector generator 108, a plurality of filters 111-1 to 111-$k$ for estimating symbols by band-pass-filtering the outputs of the multipliers 110-1 to 110-$k$, and a symbol demapper 112 for demapping the estimated symbols to binary data.

In operation, the permuter & delay 109 permutes eight received signals in a $v^{th}$ block and the vector generator 108 generates vectors composed of eight received signals in a $(v+1)^{th}$ block. The outputs of the permuter & delay 109 are multiplied by the vectors, thereby producing $P_1$ to $P_4$. The received signals can be expressed as in Equation 4:

$$r_1^v = h_1 s_1^v + h_2 s_2^v + h_3 s_3^v + h_4 s_4^v + w_1^v$$

$$r_2^v = -h_1 s_2^v + h_2 s_1^v - h_3 s_4^v + h_4 s_3^v + w_2^v$$

$$r_3^v = -h_1 s_3^v + h_2 s_4^v + h_3 s_1^v - h_4 s_2^v + w_3^v$$

$$r_4^v = -h_1 s_4^v - h_2 s_3^v + h_3 s_2^v + h_4 s_1^v + w_4^v$$

$$r_5^v = h_1 s_1^{v*} + h_2 s_2^{v*} + h_3 s_3^{v*} + h_4 s_4^{v*} + w_5^v$$

$$r_6^v = -h_1 s_2^{v*} + h_2 s_1^{v*} - h_3 s_4^{v*} + h_4 s_3^{v*} + w_6^v$$

$$r_7^v = -h_1 s_3^{v*} + h_2 s_4^{v*} + h_3 s_1^{v*} - h_4 s_2^{v*} + w_7^v$$

$$r_8^v = -h_1 s_4^{v*} - h_2 s_3^{v*} + h_3 s_2^{v*} + h_4 s_1^{v*} + w_8^v \qquad (4)$$

where $h_i$ denotes the channel gain between an $i^{th}$ transmit antenna and the receiver. By permuting $r_1^v, r_2^v, r_3^v, r_4^v, r_5^v, r_6^v, r_7^v$ and $r_8^v$, the permuter & delay 109 outputs $R_v^1$ to $R_v^4$ as shown in Equation 5:

$$R_v^1 = (r_1^v, r_2^v, r_3^v, r_4^v, r_5^{v*}, r_6^{v*}, r_7^{v*}, r_8^{v*}) \qquad (5)$$

$$= (s_1^v, s_2^v, s_3^v, s_4^v)H_\perp + (w_1^v, w_2^v, w_3^v, w_4^v, w_5^{v*}, w_6^{v*}, w_7^{v*}, w_8^{v*})$$

$$= V_1(S_v)H_\perp + W_1,$$

$$R_v^2 = (-r_2^v, r_1^v, r_4^v, -r_3^v, -r_6^{v*}, r_5^{v*}, r_8^{v*}, -r_7^{v*})$$

$$= (s_2^v, -s_1^v, s_4^v, -s_3^v)H_\perp +$$

$$(-w_2^v, w_1^v, w_4^v, -w_3^v, -w_6^{v*}, w_5^{v*}, w_8^{v*}, -w_7^{v*})$$

$$= V_2(S_v)H_\perp + W_2,$$

$$R_v^3 = (-r_3^v, -r_4^v, r_1^v, r_2^v, -r_7^{v*}, -r_8^{v*}, r_5^{v*}, r_6^{v*})$$

$$= (s_3^v, -s_4^v, -s_1^v, s_2^v)H_\perp +$$

$$(-w_3^v, -w_4^v, w_1^v, w_2^v, -w_7^{v*}, -w_8^{v*}, w_5^{v*}, w_6^{v*})$$

$$= V_3(S_v)H_\perp + W_3,$$

$$R_v^4 = (-r_4^v, r_3^v, -r_2^v, r_1^v, -r_8^{v*}, r_7^{v*}, -r_6^{v*}, r_5^{v*})$$

$$= (s_4^v, s_3^v, -s_2^v, -s_1^v)H_\perp +$$

$$(-w_4^v, w_3^v, -w_2^v, w_1^v, -w_8^{v*}, w_7^{v*}, -w_6^{v*}, w_5^{v*})$$

$$= V_4(S_v)H_\perp + W_4.$$

where $H_\perp$ is defined as shown in Equation 6:

$$H_\perp = \begin{bmatrix} h_1 & h_2 & h_3 & h_4 & h_1^* & h_2^* & h_3^* & h_4^* \\ h_2 & -h_1 & -h_4 & h_3 & h_2^* & -h_1^* & -h_4^* & h_3^* \\ h_3 & h_4 & -h_1 & -h_2 & h_3^* & h_4^* & -h_1^* & -h_2^* \\ h_4 & -h_3 & h_2 & -h_1 & h_4^* & -h_3^* & h_2^* & -h_1^* \end{bmatrix} \qquad (6)$$

The permutation values are multiplied by the signals received at the $(v+1)^{th}$ time, that is, the vectors from the vector generator 108 and the real parts of the products are calculated by Equation 7:

$$\text{Re}\{R_{v+1}^1 R_v^{k*}\} = \text{Re}\{S_{v+1}^T H_\perp H_\perp^* V'_k(S_v)^{*T} + W_k\} \qquad (7)$$

$$= 2\sum_{k=1}^{4} |h_k|^2 P_{lk} + \text{Re}\{W_k\}$$

The reason for calculating the real parts is that $V'_k(S_v)$ is not orthogonal with respect to a complex signal. That is why the conventional differential STBC transmitting/receiving apparatus does not support a complex signal.

If $P_1$ to $P_4$ are elements in a set equally distant from the origin, they can be estimated through threshold detection even though the channel values are not known. This method advantageously enables decoding even though the channel values are not known.

However, to make $P_1$ to $P_4$ have real values and, at the same time, be equally distant from the origin, $P_1$ to $P_4$ must be selected from $\{1, -1\}$. This is equivalent to using BPSK (Binary Phase Shift Keying). When a higher-order modulation scheme is used to increase data rate, joint design of the $P_1$ to $P_4$ is required, thus increasing the complexity of the receiver considerably.

SUMMARY OF THE INVENTION

As described above, the conventional method cannot produce complex values as $P_1$ to $P_4$ for three or four transmit antennas. Therefore, even if a signal can be transmitted in the form of a complex signal, a complex modulation scheme cannot be adopted in real implementation. Even for a real signal, there are no known differential STBC transmitting/receiving apparatuses for five or more transmit antennas.

An object of the present invention is to substantially solve at least the above problems and/or disadvantages and to provide at least the advantages below. Accordingly, an object of the present invention is to provide a differential STBC transmitting/receiving apparatus designed to dispose a space-time block before a differential space-time block so that it can transmit a complex signal through and including four transmit antennas and a real signal through and including eight transmit antennas.

The above objects are achieved by providing a differential STBC transmitting/receiving apparatus in a multiple antenna system using eight or less transmit antennas. In the differential STBC transmitting apparatus, a symbol mapper receives binary data and generates a predetermined number of symbols from the binary data, each symbol having a predetermined number of bits. A space-time block encoder generates an STBC by encoding the symbols. A differential processor differentially encodes the STBC through the use of feedback and delay. A distribution matrix processor substitutes the differentially coded STBC into a distribution matrix preset according to the number of transmit antennas, and outputs to the transmit antennas the differential STBC code of the distribution matrix.

In the differential STBC receiving apparatus, a vector generator receives an STBC from a transmitter and generates a vector $(R_{v+1})$ from the STBC. A differential deprocessor simultaneously outputs the vector $(R_{v+1})$ and a delayed previous vector $(R_v)$. A coherent space-time block decoder estimates symbols using the vector $(R_{v+1})$ and the delayed previous vector $(R_v)$. A symbol demapper demaps the estimated symbols to binary data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a differential STBC transmitting/receiving apparatus that supports up to eight transmit antennas when transmitting a real signal and up to four transmit antennas when transmitting a complex signal.

Figure 2A:
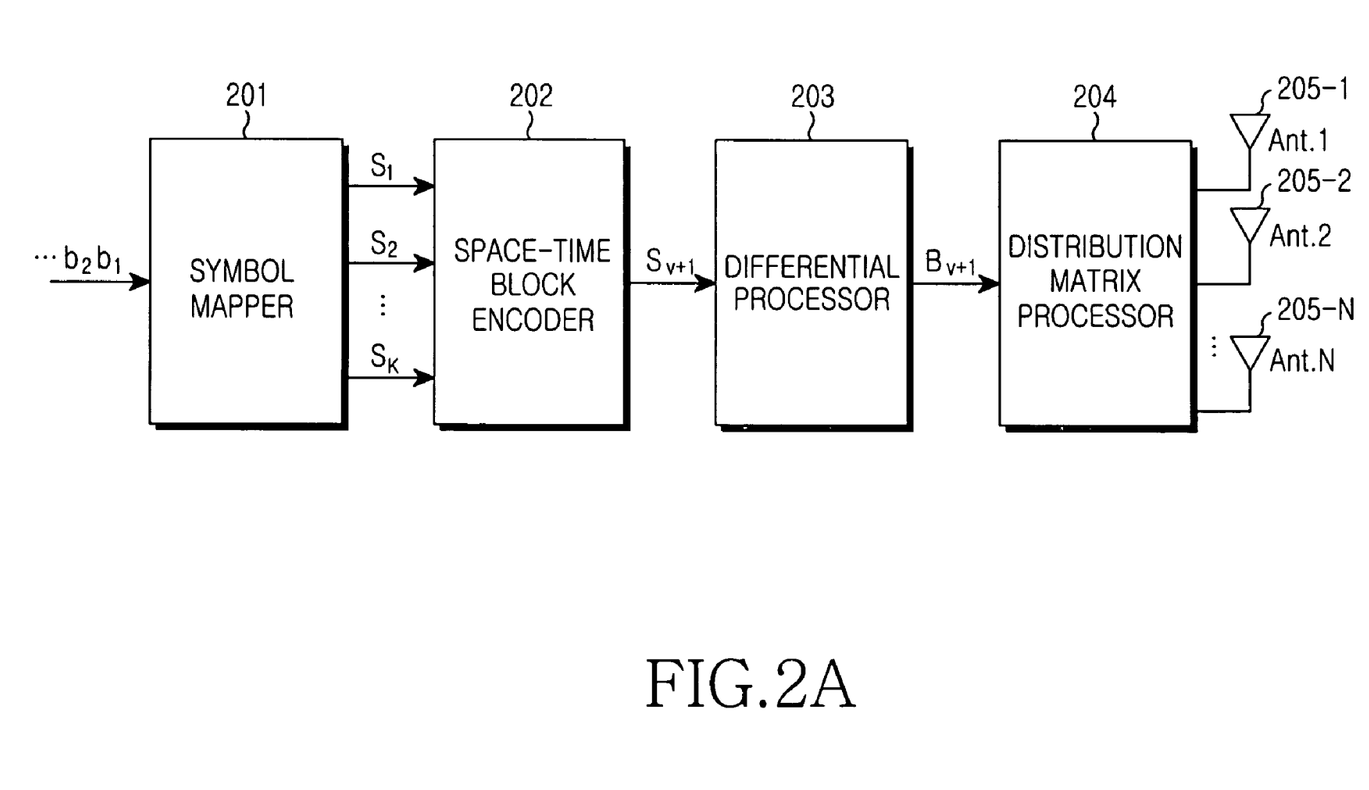
FIGS. 2A and 2B are block diagrams of a differential STBC transmitting/receiving apparatus according to an embodiment of the present invention.
Figure 2B:
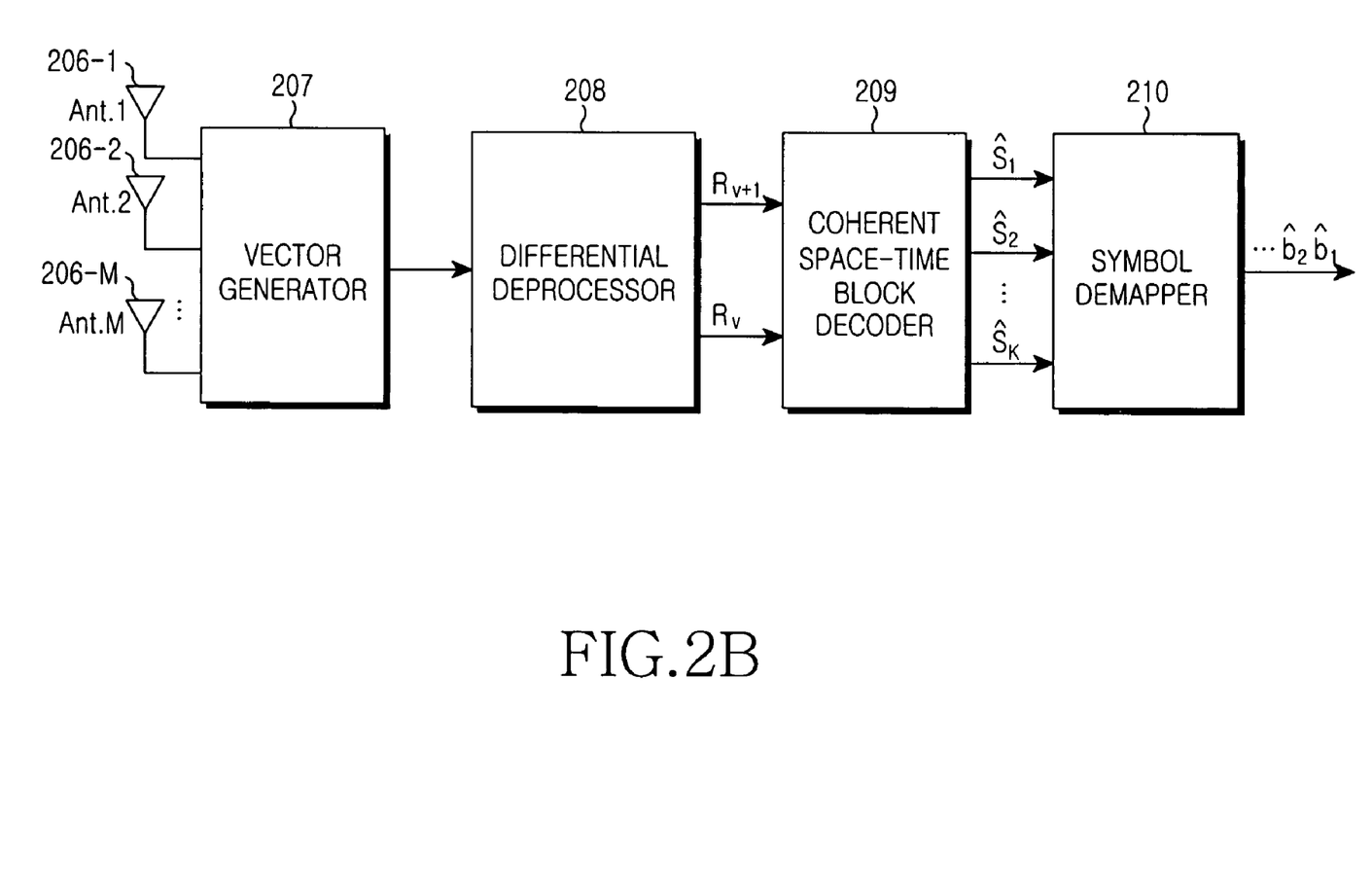

FIGS. 2A and 2B are block diagrams of a differential STBC transmitting/receiving apparatus according to an embodiment of the present invention.

As illustrated in FIG. 2A, for transmission of a differential STBC, the conventional method maps differentially coded symbols to a transmission matrix, whereas the present invention first maps symbols to a transmission matrix and then differentially encodes the transmission matrix itself.

Referring to FIG. 2A, a differential STBC transmitter is comprised of a symbol mapper 201 for generating K symbols, $s_1, s_2 \ldots s_K$ from input binary data $b_1 b_2 \ldots b_i$ by mapping every $2^b$ bits to one symbol, a space-time block encoder 202 for generating a STBC by encoding the symbols, a differential processor 203 for differentially encoding the STBC through feedback and delay, and a distribution matrix processor 204 for substituting the differentially coded STBC into a distribution matrix preset according to the number of transmit antennas 205-1 to 205-N.

Figure 3:
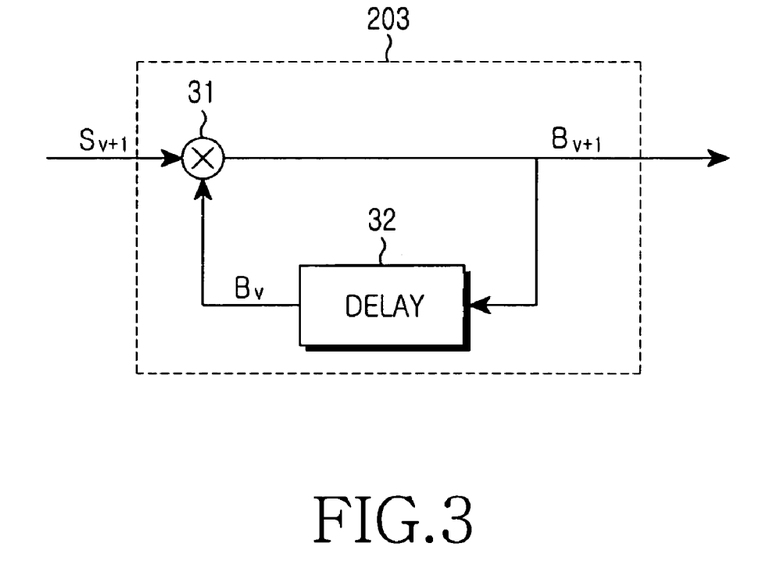
FIG. 3 is a detailed block diagram of a differential processor illustrated in FIG. 2A.

The differential processor 203 is illustrated in more detail in FIG. 3. Referring to FIG. 3, the differential processor 203 includes a multiplier 31 for multiplying a STBC $S_{v+1}$ received from the space-time block encoder 202 by a delayed signal B, and outputting the resulting signal $B_{v+1}$, and a delay 32 for delaying the previous output B, of the multiplier 31 and outputting the delayed signal to the multiplier 31.

For better understanding of the present invention, the differential STBC transmitting/receiving apparatus will be described in the context of a system with eight or less transmit antennas and a single receive antenna. It is obvious that the present invention can be generalized to any number of receive antennas even if the single receive antennas is assumed herein.

For two transmit antennas, a signal is transmitted on a two-symbol period basis, for three or four transmit antennas, a signal is transmitted on a four-symbol period basis, and for five to eight transmit antennas, a signal is transmitted on an eight-symbol period basis. According to numbers of transmit antennas, the following distribution matrices illustrated in Equations 8 through 14 are available.

$$G_{22} = \begin{bmatrix} a_1 & a_2 \\ -a_2 & a_1 \end{bmatrix} \quad (8)$$

$$B_{22} = \begin{bmatrix} a_1 & a_2 \\ -a_2^* & a_1^* \end{bmatrix} \quad (9)$$

$$G_{43} = \begin{bmatrix} a_1 & a_2 & a_3 \\ -a_2 & a_1 & -a_4 \\ -a_3 & a_4 & a_1 \\ -a_4 & -a_3 & a_2 \end{bmatrix} \quad (10)$$

$$G_{44} = \begin{bmatrix} a_1 & a_2 & a_3 & a_4 \\ -a_2 & a_1 & -a_4 & a_3 \\ -a_3 & a_4 & a_1 & -a_2 \\ -a_4 & -a_3 & a_2 & a_1 \end{bmatrix} \quad (11)$$

$$B_{43} = \begin{bmatrix} a_1 & a_2 & a_3 \\ -a_2^* & a_1^* & 0 \\ -a_3^* & 0 & a_1^* \\ 0 & -a_3^* & a_2^* \end{bmatrix} \quad (12)$$

$$B_{44} = \begin{bmatrix} a_1 & a_2 & a_3 & 0 \\ -a_2^* & a_1^* & 0 & a_3 \\ -a_3^* & 0 & a_1^* & -a_2 \\ 0 & -a_3^* & a_2^* & a_1 \end{bmatrix} \quad (13)$$

-continued $$G_{88} = \begin{bmatrix} a_1 & a_2 & a_3 & a_4 & a_5 & a_6 & a_7 & a_8 \\ -a_2 & a_1 & a_4 & -a_3 & a_6 & -a_5 & -a_8 & a_7 \\ -a_3 & -a_4 & a_1 & a_2 & a_7 & a_8 & -a_5 & -a_6 \\ -a_4 & a_3 & -a_2 & a_1 & a_8 & -a_7 & a_6 & -a_5 \\ -a_5 & -a_6 & -a_7 & -a_8 & a_1 & a_2 & a_3 & a_4 \\ -a_6 & a_5 & -a_8 & a_7 & -a_2 & a_1 & -a_4 & a_3 \\ -a_7 & a_8 & a_5 & -a_6 & -a_3 & a_4 & a_1 & -a_2 \\ -a_8 & -a_7 & a_6 & a_5 & -a_4 & -a_3 & a_2 & a_1 \end{bmatrix} \quad (14)$$

where G denotes a matrix for the transmission of a real signal and B denotes a matrix for transmission of a complex signal. $G_{43}$ is the first three columns of $G_{44}$, and $B_{43}$ is the first three columns of $B_{44}$. The distribution matrices for five to eight transmit antennas, that is, for N=5, 6, 7 and 8 are submatrices of G88 with N columns.

The above distribution matrices, which are well known, are used for the conventional apparatus for transmitting/receiving a coherent STBC designed to be orthogonal.

The differential STBC transmitter of the present invention presets distribution matrices depending on real or complex signal constellations for symbol mapping and the number of the transmit antennas used.

$B_{43}$, that is, the case of transmitting a complex signal through three transmit antennas, will be described as an example. While not described in the embodiment of the present invention, the following description makes it clear to those skilled in the art that the present invention is applicable to the transmission of a complex signal through four or less transmit antennas as well as to the transmission of a real signal through eight or less transmit antennas.

In the embodiment of the present invention, transmission of a space-time block coded signal for the input of a binary signal starts from selecting arbitrary symbols $S_1=(s_{1,1}, s_{1,2}, s_{1,3})$ and substituting them into a distribution matrix $B_{43}{}^1$. In this way, an $(i, t)^{th}$ element of $B_{43}{}^1$ in the first block is transmitted through an $i^{th}$ transmit antenna at a $t^{th}$ time.

The symbols of the first block carry no information and these symbols are not known to the receiver.

Symbols in blocks subsequent to a $v^{th}$ block can be recursively expressed as follows. If a distribution matrix $B_{43}{}^v$ has been transmitted in the $v^{th}$ block in the same manner as in the first block, input binary data are modulated to symbols $S_{v+1}=(s_{v+1,1}, s_{v+1,2}, s_{v+1,3})$ and the modulated symbols substitute for $a_1$, $a_2$, and $a_3$ in $B_{44}$, thereby creating a matrix $S_{44}{}^{v+1}$ for a $(v+1)^{th}$ block. The differential processor 203 generates a new matrix $B_{43}{}^{v+1}$ for the $(v+1)^{th}$ block by multiplying $S_{44}{}^{v+1}$, the matrix transmitted in the previous block, by $B_{43}{}^v$ as delayed by the delay 32.

This operation of the multiplier 31 is given as shown in Equation 15:

$$B_{43}{}^{v+1} = S_{44}{}^{v+1} B_{43}{}^v \quad (15)$$

In this way, an $(i, t)^{th}$ element of $B_{43}{}^{v+1}$ is transmitted through an $i^{th}$ transmit antenna at a $t^{th}$ time.

The reason for using the matrix $B_{44}$ is that the $B_{44}$ matrix has as many rows as the matrix $B_{43}$ and it is the smallest matrix having orthogonality. To design a differential STBC using $G_{8N}$ for five to eight transmit antennas, $S_{44}{}^{v+1}$ must be replaced by a matrix $S_{88}{}^{v+1}$ produced by substituting eight symbols $S_{v+1}=(s_{v+1,1}, s_{v+1,2}, \ldots, s_{v+1,8})$ into $G_{88}$.

Now the differential STBC receiver of the present invention will be described below.

FIG. 2B is a block diagram of a receiver with M receive antennas 206-1 to 206-M. The receiver is comprised of a vector generator 207 for generating a vector $R_{v+1}$ for the input of a STBC transmitted from the transmitter, a differential deprocessor 208 for outputting the current vector $R_{v+1}$ and a delayed vector $R_v$, a coherent space-time block decoder 209 for estimating symbols using the vectors $R_v$ and $R_{v+1}$, and a symbol demapper 210 for demapping the estimated symbols to binary data.

Figure 4:
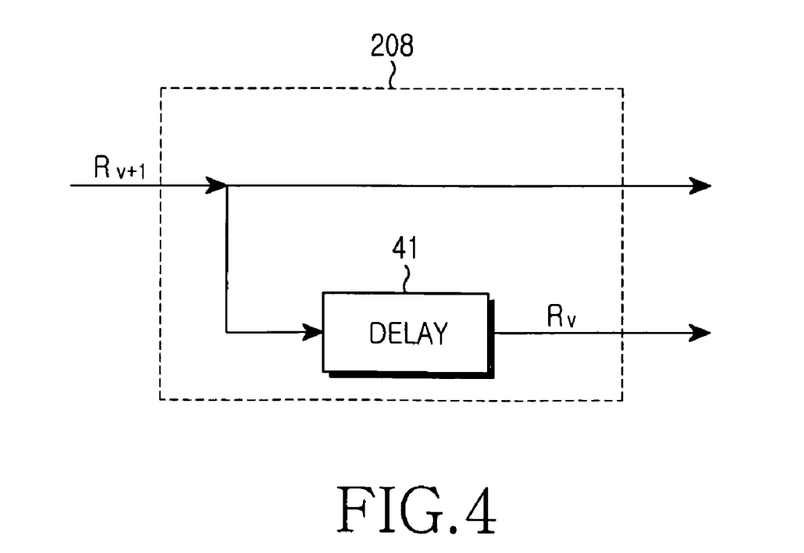
FIG. 4 is a detailed block diagram of a differential deprocessor illustrated in FIG. 2B.

The differential deprocessor 208 is illustrated in more detail in FIG. 4.

Referring to FIG. 4, the differential deprocessor 208 includes a transmission path in which the current vector $R_{v+1}$ received from the vector generator 207 is passed, and a delay 41 for delaying the previous vector $R_v$ generated from the vector generator 207 and outputting $R_v$ and $R_{v+1}$ together.

In operation, assuming that a channel gain $h=(h_1, h_2, h_3)^T$ does not vary over time for two successive blocks, a signal received in the $v^{th}$ block is expressed as Equation 16:

$$X_v = B_{43}{}^v h + W_v \quad (16)$$

where $X_v=(x_{v,1}, X_{v,2}, X_{v,3}, X_{v,4})^T$ is a signal received for four symbol periods, and $W_v=(w_{v,1}, w_{v,2}, w_{v,3}, w_{v,4})^T$ is a noise signal.

In the same manner, a signal received in a $(v+1)^{th}$ block is expressed as in Equation 17:

$$X_{v+1} = B_{43}{}^{v+1} h + W_{v+1} \quad (17)$$

By substituting Equation 15 into Equation 17, Equation 18 results:

$$\begin{aligned} X_{v+1} &= B_{43}^{v+1} h + W_{v+1} \\ &= S_{44}^{v+1} B_{43}^v h + W_{v+1} \\ &= S_{44}^{v+1} X_v + N_{v+1} \end{aligned} \quad (18)$$

where the noise component $N_{v+1}$ is expressed as in Equation 19:

$$N_{v+1} = -S_{44}{}^{v+1} W_v + W_{v+1} \quad (19)$$

Due to the orthogonality of $S_{44}{}^{v+1}$, the variance of the noise component in Equation 18 is increased by two and the distribution of the noise component is maintained, compared to the coherent STBC.

Equation 18 eventually represents a received signal in the conventional coherent STBC transmitting/receiving apparatus using $B_{44}$. That is, if $X_v$ is considered to be a channel gain, Equation 18 is a formula for the conventional receiver that receives $X_{v+1}$.

Figure 5:
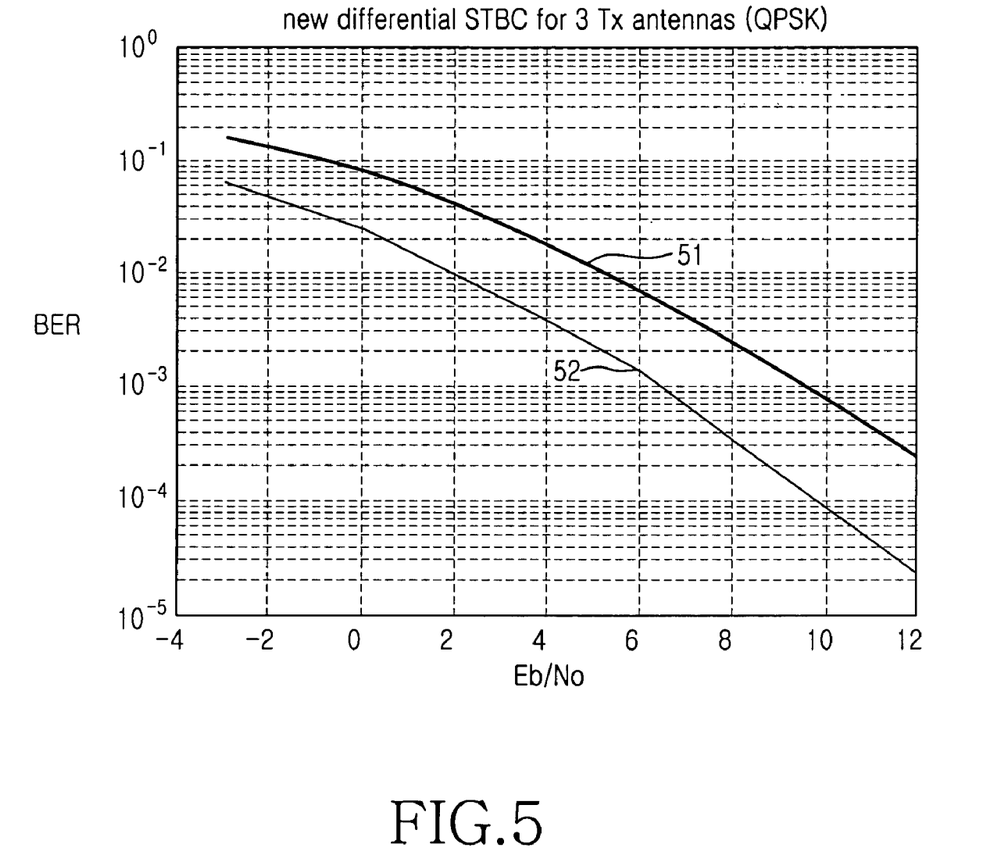
FIG. 5 is a graph comparing the performance of the differential STBC transmitting/receiving apparatus of the present invention with a conventional coherent STBC transmitting/receiving apparatus.

FIG. 5 is a graph comparing the performance the differential STBC transmitting/receiving apparatus of the present invention with the conventional coherent STBC transmitting/receiving apparatus.

Referring to FIG. 5, a curve 51 representing the differential STBC of the present invention demonstrates a performance decrease of about 3 dB relative to a curve 52 representing the coherent STBC. The former has a noise signal variance twice as large as that of the latter. Yet, the performance decrease is a characteristic of a differential STBC transmitting/receiving apparatus without channel estimation, not inherent to the present invention.

In accordance with the present invention as described above, the differential STBC transmitting/receiving apparatus, in which the receiver need not use a channel gain to recover a transmitted signal, enables the transmission of a complex signal through three or four transmit antennas.

The differential STBC transmitting/receiving apparatus also enables the transmission of a real signal through five to eight transmit antennas.

Therefore, despite the increase of transmit antennas in number, the differential STBC transmitting/receiving apparatus has the same performance as that of the conventional one.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for transmitting a space-time block code (STBC) in a multiple antenna system, having a number of transmit antennas, comprising:
   a symbol mapper for generating a number of symbols from the received binary data, upon receipt of binary data, each symbol having a number of bits;
   a space-time block encoder for generating an STBC by encoding the generated symbols;
   a differential encoding processor for differentially encoding the generated STBC through feedback and delay; and
   a distribution matrix processor for substituting the differentially encoded STBC into a distribution matrix, and outputting the differential STBC code of the distribution matrix to transmit antennas,
   wherein distribution matrix is set from among first matrices used for transmission of a real signal and second matrices used for transmission of a complex signal, depending on whether the symbols are real or complex and the number of the transmit antennas, and
   wherein the first matrices are defined by the following G matrices and the second matrices are defined by the following B matrices $$G_{22} = \begin{bmatrix} a_1 & a_2 \\ -a_2 & a_1 \end{bmatrix}$$

$$B_{22} = \begin{bmatrix} a_1 & a_2 \\ -a_2^* & a_1^* \end{bmatrix}$$

$$G_{43} = \begin{bmatrix} a_1 & a_2 & a_3 \\ -a_2 & a_1 & -a_4 \\ -a_3 & a_4 & a_1 \\ -a_4 & -a_3 & a_2 \end{bmatrix}$$

$$B_{43} = \begin{bmatrix} a_1 & a_2 & a_3 \\ -a_2^* & a_1^* & 0 \\ -a_3^* & 0 & a_1^* \\ 0 & -a_3^* & a_2^* \end{bmatrix}$$

$$G_{44} = \begin{bmatrix} a_1 & a_2 & a_3 & a_4 \\ -a_2 & a_1 & -a_4 & a_3 \\ -a_3 & a_4 & a_1 & -a_2 \\ -a_4 & -a_3 & a_2 & a_1 \end{bmatrix}$$

$$B_{44} = \begin{bmatrix} a_1 & a_2 & a_3 & 0 \\ -a_2^* & a_1^* & 0 & a_3 \\ -a_3^* & 0 & a_1^* & -a_2 \\ 0 & -a_3^* & a_2^* & a_1 \end{bmatrix},$$

wherein at least one of the second matrices used for transmission of the complex signal is not square and the symbols are complex.

2. The apparatus of claim 1, wherein the differential processor comprises:
   a multiplier for multiplying the STBC ($S_{v+1}$) by a delayed output signal ($B_v$) and outputting the differentially coded STBC ($B_{v+1}$) to the distribution matrix processor; and
   a delay for delaying a previous output signal ($B_v$) of the multiplier and outputting the delayed signal ($B_v$) to the multiplier.

3. An apparatus for receiving a space-time block code (STBC) in a multiple antenna system, comprising:
   a vector generator for generating a vector ($R_{v+1}$) from a received STBC transmitted into a distribution matrix via transmit antennas, upon receipt of the STBC from a transmitter;
   a differential decoding processor for simultaneously outputting the vector ($R_{v+1}$) and a delayed previous vector ($R_v$);
   a coherent space-time block decoder for estimating symbols using the vector ($R_{v+1}$) and the delayed previous vector ($R_v$); and
   a symbol demapper for demapping the estimated symbols to binary data,
   wherein the distribution matrix is set from among first matrices used for transmission of a real signal and second matrices used for transmission of a complex signal, depending on whether the symbols are real or complex and the number of the transmit antennas, and
   wherein the first matrices are defined by the following G matrices and the second matrices are defined by the following B matrices $$G_{22} = \begin{bmatrix} a_1 & a_2 \\ -a_2 & a_1 \end{bmatrix}$$

$$B_{22} = \begin{bmatrix} a_1 & a_2 \\ -a_2^* & a_1^* \end{bmatrix}$$

$$G_{43} = \begin{bmatrix} a_1 & a_2 & a_3 \\ -a_2 & a_1 & -a_4 \\ -a_3 & a_4 & a_1 \\ -a_4 & -a_3 & a_2 \end{bmatrix}$$

$$B_{43} = \begin{bmatrix} a_1 & a_2 & a_3 \\ -a_2^* & a_1^* & 0 \\ -a_3^* & 0 & a_1^* \\ 0 & -a_3^* & a_2^* \end{bmatrix}$$

$$G_{44} = \begin{bmatrix} a_1 & a_2 & a_3 & a_4 \\ -a_2 & a_1 & -a_4 & a_3 \\ -a_3 & a_4 & a_1 & -a_2 \\ -a_4 & -a_3 & a_2 & a_1 \end{bmatrix}$$

-continued $$B_{44} = \begin{bmatrix} a_1 & a_2 & a_3 & 0 \\ -a_2^* & a_1^* & 0 & a_3 \\ -a_3^* & 0 & a_1^* & -a_2 \\ 0 & -a_3^* & a_2^* & a_1 \end{bmatrix},$$

wherein at least one of the second matrices used for transmission of the complex signal is not square and the symbols are complex.

4. The apparatus of claim 3, wherein the differential decoding processor comprises:

a transmission path for passing the vector ($R_{v+1}$) received from the vector generator; and a delay for delaying a previous vector ($R_v$) received from the vector generator so that the previous vector ($R_v$) and the vector ($R_{v+1}$) can be output simultaneously from the differential decoding processor.

\* \* \* \* \*